July 23, 1963 F. D. JOESTING 3,098,504

TWO-STAGE FLUID OSCILLATOR

Filed March 26, 1962

INVENTOR.
FREDERICK D. JOESTING
BY
Alfred N. Feldman
ATTORNEY 3,098,504
Patented July 23, 1963

3,098,504

TWO-STAGE FLUID OSCILLATOR

Frederick D. Joesting, Park Ridge, Ill., assignor to Minneapolis-Honeywell Regulator Company, Minneapolis, Minn., a corporation of Delaware Filed Mar. 26, 1962, Ser. No. 182,323
5 Claims. (Cl. 137—624.14)

The present invention is directed to a fluid operated device that utilizes a recently developed fluid amplifier principle. More specifically, the present invention is directed to a fluid amplifier type of oscillator that utilizes two stages of fluid control and wherein both stages are arranged to occupy the same layer within the device. In most fluid amplifier type devices that utilize more than a single stage, the stages are cascaded in separate layers and these layers are then interconnected by appropriate pipes. The present two-stage fluid amplifier type oscillator is arranged in a generally concentric arrangement thereby allowing a single layer for two amplifier stages.

The principle of operation of a fluid amplifier has been extensively discussed in the literature and is known in the patent art. Two patents which discuss the general principles of the fluid amplifier art are Patents No. 3,001,539 to Hurvitz and No. 3,001,698 to Warren. In addition to these patents, a third patent to Warren No. 3,016,066 discusses the basic principle of utilizing a fluid amplifier type device as an oscillator. The present invention is an improvement on the Warren Patent No. 3,016,066.

It is the primary object of the present invention to disclose a fluid amplifier type of oscillator that has a single inlet that feeds two stages of amplification that are contained in a single layer.

Another object of the present invention is to disclose a fluid amplifier type oscillator that has a number of control passages thereby providing better control of the necessary fluid resistances to obtain more accurate control of the oscillating frequency.

Yet another object of the present invention is to disclose a two-stage fluid oscillator that utilizes a pilot amplifier to control the main oscillator section thereby providing for large volume of fluid flow with accurate control.

These and other objects will become apparent when the present specification is considered with the drawings, wherein.

Figure 1:
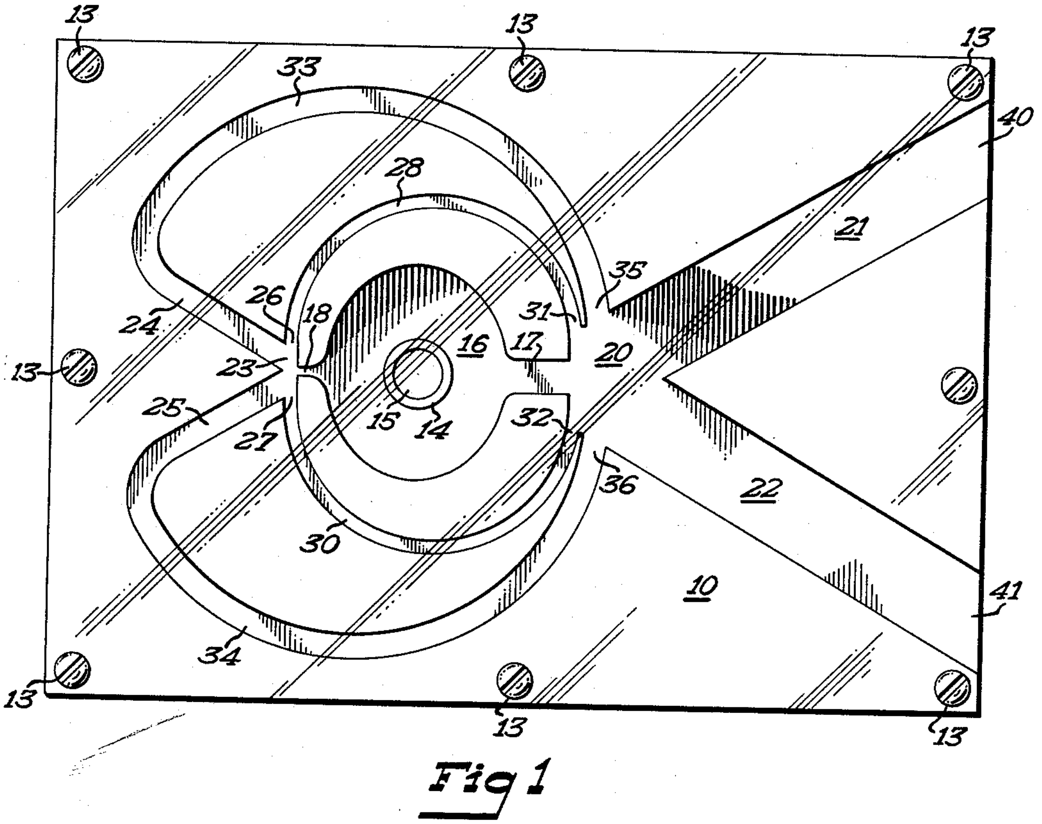
FIGURE 1 is a top view of the two-stage fluid amplifier oscillator.
Figure 2:
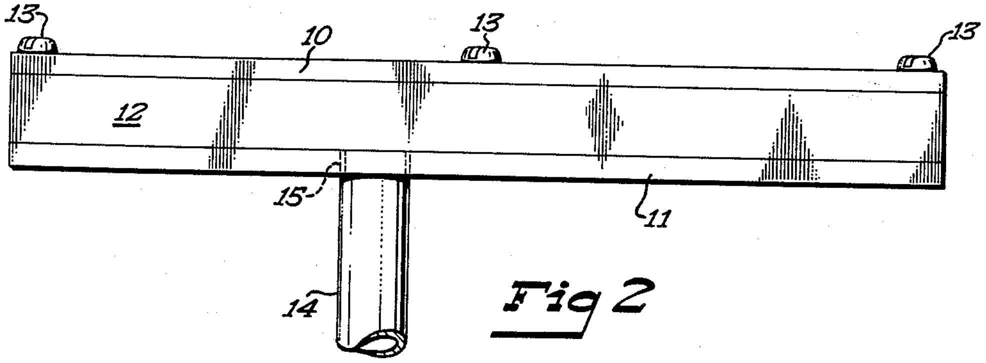
FIGURE 2 is a side elevation of the fluid amplifier oscillator disclosing the single inlet and single layer configuration.

The present fluid amplifier device is basically built up in a layer form wherein a plate 10 and a plate 11 of substantially solid material are placed on opposite sides of the main layer 12. While these have been shown as flat, they could be curved, if desired. The main layer 12 has the necessary passages cut into it to supply the fluid flow passages. The plates 10 and 11 are attached to the layer 12 by a plurality of screws 13 that hold the device in a fluid tight arrangement. In the present drawings, the plates 10 and 11 are disclosed as transparent plastic thereby disclosing the fluid flow configuration of the plate 12.

A pipe 14 is threaded into a hole 15 in a fluid tight fashion thereby providing a fluid inlet means for the oscillator. In FIGURE 1 the pipe 14 can be seen leading into a single inlet chamber 16 which is generally circular in configuration and which further is generally concentric with the center of the pipe 14. The chamber 16 forms an inlet means generally for the device and it has two fluid flow passages 17 and 18 which form the outlets for the chamber 16. The passages 17 and 18 each form the outlet throat or passage for a fluid oscillator or amplifier stage.

The passage 17 leads into an outlet means 20 that has two legs 21 and 22 that form the final outlet or flow passages for the two-stage fluid oscillator. Associated with passage 18 is an outlet means 23 which has a pair of legs 24 and 25 that form an outlet means for the passage 18. Further associated with the outlet passage 18 are a pair of control ports 26 and 27. The control ports 26 and 27 are connected by passages 28 and 30 to a second pair of control ports 31 and 32. The balance of the present device is made up of a pair of passages 33 and 34 that are connected to the outlet passages or legs 24 and 25 respectively and that connect to a third pair of control ports 35 and 36 which feed into the outlet means 20. It is understood that the size of the outlet ports 26, 27, 31, 32, 35, and 36 are adjusted in size to obtain the desired characteristics from the present device as is taught in the fluid amplifier art. The passages 28, 30, 33 and 34 are also adjusted in size to give the desired fluid resistance to obtain the necessary feedback delay times to obtain an oscillator that will run at a particular frequency. The output of the two-stage fluid oscillator is by means of outlets 40 and 41 which are connected in a fluid tight manner to any desired device.

The present device can be connected to any source of fluid under pressure. The fluid can be of any type such as a liquid, a gas, a mixture of a liquid and a gas, or a mixture of a fluid, gas, and solid particles that will move under a pressure differential. Since the present device can be fabricated from most any type of material, the selection of the particular fluid and type of construction is not a material part of the present invention.

In operation, the device is filled with an appropriate fluid under pressure and the fluid fills all of the described channels. Since the present device, in practice, cannot be built entirely symmetrically, the fluid issuing from passages 17 and 18 will tend to create a disturbance in the device. If it is assumed that the fluid passing out of passage 17 initially flows primarily in channel or passage 21 to outlet 40, it will be appreciated that a lower pressure will exist at ports 31 and 35 than at ports 32 and 36. This follows the teaching of the basic fluid amplifier principles that a lower pressure exists along the wall to which the amplifier attaches than on the free side of the fluid flow stream. Since there is a lower pressure in ports 31 and 35 than in ports 32 and 36, and flow from passage 18 lowers the pressure at port 27, some of the fluid will flow into passage 30 and flow out of the port 27. The jet of fluid flowing out of port 27 impinges on the side of the fluid flowing from passage 18 thereby causing the output from the passage 18 to flow into the outlet means 23 and passage 24 to the connecting passage 33. The fluid flow in passage 33 exits from port 35 against the side of fluid flowing in outlet means 20. This jet of fluid shifts the main flow from passage 17 so that it shifts and flows out of the outlet passage 22 to the outlet 41. This shift in fluid flow in the main or outlet portion of the oscillator shifts the pressure differential at the ports 31, 35, 32 and 36. As such, a higher pressure exists in port 31 than in port 32 and port 26 and fluid begins to flow in passage 28. The fluid flowing in passage 28 exits from port 26 thereby shifting the output flow of fluid from the passage 18 into the leg or passage 25 and into channel 34. This fluid then results in a jet passing out of port 36 against the side of the main fluid stream from passage 17 and shifts the amplifier oscillator once again into the channel 21. This form of oscillation continues in a free running manner and is a function of the fluid resistance of the various passages.

In reality more pressure and flow changes occur than are described in the previous description. These changes in pressure and flow will be briefly outlined to provide a fuller explanation. Due to the inherent instability when flowing in a symmetrical pattern, flow will occur in one passage or the other. If it is assumed that the initial flow takes place in passages 25 and 34, the output will be in the passage 21. As soon as this flow pattern is established, pressure changes will occur which will cause the flow to switch. If these changes are examined, and the pressures are considered just before the switching occurs, the following relative pressure pattern will exist. Pressure will be substantially simultaneously high at port 32 and low at port 27. This will apply a signal to the flow from passage 18 to switch the device to passage 24. This will provide a high pressure at port 36, which adds to the resistance to flow in the passage 34. The pressure will then be high at port 26 and low at port 31. This will insure that there is no signal at port 26 which opposes the signal at port 27, and this port may also supply some signal fluid to the flow from the passage 17. The pressure will be then low at port 35 which encourages flow in passage 33 to switch the flow coming from the passage 17, thereby operating the device.

By supplying a two-stage device of the type disclosed it is possible to adjust the frequency of oscillation by adjusting the size of the various passages. This arrangement provides better adjustment of the frequency of operation of the amplifier than is accomplished in a single stage device such as is disclosed in the Warren Patent No. 3,016,066.

It should be further appreciated that the present device can be made in a non-symmetrical arrangement wherein the fluid passages 17 and 18 are not necessarily diametrically opposite one another, but can be arranged in any suitable or convenient layout as long as the concept of maintaining a single layer for the passages is retained. It is obvious from the above description that the present device can be varied extensively without changing the concept of the invention. As such the applicant wishes to be limited in the scope of his invention only by the appended claims.

I claim as my invention:

1. In a two-stage fluid amplifier type oscillator wherein all the fluid flow paths of both stages are disposed in a generally concentric single layer, including: a fluid inlet supplied with a fluid under pressure; said inlet having two diametrically opposed fluid flow passages each of which is directed into separate outlet means each having two outlet channels; a pair of control ports directed into each flow passage and said ports disposed on opposite sides of said flow passages; a first control port of each pair of control ports being connected together by a flow path and a second control port of each pair of control ports also being connected together by a flow path thereby providing feedback control paths between said fluid flow passages; a third pair of control ports directed into one of said flow passages and each of said third pair being connected to a separate outlet channel of a first of said outlet means which is opposite the flow passage into which the third pair of ports is directed to receive the entire fluid flow in said first outlet means; and said second outlet means supplying a fluid outlet for said oscillator wherein said fluid shifts periodically between said two outlet channels dependent upon the fluid flow in said flow passages and through control ports thereby providing a free running fluid oscillator.

2. In a two-stage fluid amplifier type oscillator wherein all the fluid flow paths of both stages are disposed in a generally concentric single layer, including: a fluid inlet supplied with a fluid under pressure; said inlet having two fluid flow passages each of which is directed into separate outlet means each having two outlet channels; a pair of control ports directed into each flow passage and said ports disposed on opposite sides of said flow passages; a first control port of each pair of control ports being connected together by a flow path and a second control port of each pair of control ports also being connected together by a flow path thereby providing feedback control paths between said fluid flow passages; a third pair of control ports directed into one of said flow passages and each of said third pair being connected to a separate outlet channel of a first of said outlet means which is opposite the flow passage into which the third pair of ports is directed to receive the entire fluid flow in said first outlet means; and said second outlet means supplying a fluid outlet for said oscillator wherein said fluid shifts periodically between said two outlet channels dependent upon the fluid flow in said flow passages and through control ports thereby providing a free running fluid oscillator.

3. In a two-stage fluid amplifier type oscillator wherein all the fluid flow paths of both stages are disposed in a single layer, including: fluid inlet means supplied with a fluid under pressure; said inlet means having two fluid flow passages each of which is directed into separate outlet means; a pair of control ports associated with each flow passage and said ports disposed on opposite sides of said flow passages; a first control port of each pair of control ports being connected together and a second control port of each pair of control ports also being connected together thereby providing feedback control paths between said fluid flow passages; a third pair of control ports associated with one of said flow passages and each of said third pair being connected to a first of said outlet means which is opposite the flow passage into which the third pair of ports is directed to receive the fluid flow in said first outlet means; and said second outlet means supplying a fluid outlet for said oscillator wherein said fluid shifts periodically dependent upon the fluid flow in said flow passages and through control ports thereby providing a free running fluid oscillator.

4. In a two-stage fluid amplifier type oscillator wherein all the fluid flow paths of both stages are disposed in a single layer, including: fluid inlet means supplied with a fluid under pressure; said inlet means having a plurality of fluid flow passages each of which is directed into separate outlet means; a plurality of control ports associated with each flow passage and said ports disposed on opposite sides of said flow passages; a first control port of each plurality of control ports being connected together and a second control port of each plurality of control ports also being connected together thereby providing feedback control paths between said fluid flow passages; a third plurality of control ports associated with one of said flow passages and at least two of said third plurality being connected to a first of said outlet means which is opposite the flow passage into which the third plurality of ports is directed to receive the fluid flow in said first outlet means; and said second outlet means supplying a fluid outlet for said oscillator wherein said fluid shifts periodically dependent upon the fluid flow in said flow passages and through control ports.

5. In a two-stage fluid oscillator wherein all the fluid flow paths of both stages are disposed in a single layer, including: fluid inlet means supplied with a fluid under pressure; said inlet means having a plurality of fluid flow passages each of which is directed into separate outlet means; a plurality of control ports associated with each flow passage and said ports disposed on opposite sides of said flow passages; a first control port of each plurality of control ports being connected together and a second control port of each plurality of control ports also being connected together thereby providing feedback control paths between said fluid flow passages; a third plurality of control ports associated with one of said flow passages and two of said third plurality being connected to a first of said outlet means which is opposite the flow passage into which the third plurality of ports is directed to receive the fluid flow in said first outlet means; and said second outlet means supplying at least one fluid outlet for said oscillator wherein said fluid shifts periodically dependent upon the fluid flow in said flow passages and through control ports.

References Cited in the file of this patent

UNITED STATES PATENTS 3,016,066 Warren ------------------ Jan. 9, 1962